United States Patent
Davis

(10) Patent No.: US 11,125,593 B2
(45) Date of Patent: Sep. 21, 2021

(54) ANOMALY DETECTION AND NEURAL NETWORK ALGORITHMS FOR PST HYDROCYCLONE CONDITION MONITORING

(71) Applicant: CiDRA Corporate Services LLC, Wallingford, CT (US)

(72) Inventor: Michael A. Davis, Glastonbury, CT (US)

(73) Assignee: CIDRA CORPORATE SERVICES LLC, Wallingford, CT (US)

( * ) Notice: Subject to any disclaimer, the term of this patent is extended or adjusted under 35 U.S.C. 154(b) by 225 days.

(21) Appl. No.: 16/334,895

(22) PCT Filed: Sep. 21, 2017

(86) PCT No.: PCT/US2017/052607
§ 371 (c)(1),
(2) Date: Mar. 20, 2019

(87) PCT Pub. No.: WO2018/057676
PCT Pub. Date: Mar. 29, 2018

(65) Prior Publication Data
US 2020/0018625 A1   Jan. 16, 2020

Related U.S. Application Data

(60) Provisional application No. 62/397,565, filed on Sep. 21, 2016.

(51) Int. Cl.
*G01F 1/32* (2006.01)
*B04C 9/00* (2006.01)
(Continued)

(52) U.S. Cl.
CPC ........... *G01F 1/32* (2013.01); *B04C 9/00* (2013.01); *B04C 11/00* (2013.01); *G06N 3/02* (2013.01)

(58) Field of Classification Search
CPC ... B04C 9/00; B04C 11/00; G01F 1/32; G01F 1/3254; G01F 1/71; G01F 25/00; G06N 3/02
See application file for complete search history.

(56) References Cited

U.S. PATENT DOCUMENTS

| 5,132,024 A | * | 7/1992 | Hulbert | B01D 17/0214 210/739 |
| 5,248,442 A | * | 9/1993 | Hulbert | B01D 17/0214 210/740 |

(Continued)

FOREIGN PATENT DOCUMENTS

WO    2016007139 A1    1/2016

*Primary Examiner* — Joseph C Rodriguez
(74) *Attorney, Agent, or Firm* — Ware, Fressola, Maguire & Barber LLP

(57) ABSTRACT

A system includes a learning network having a signal processor configured to: receive learned signaling containing information about representative samples of conditions related to operating states of a hydrocyclone and characterized as learned samples of each condition when the learning network is trained, and raw signaling containing information about raw samples containing information about the current operation of the hydrocyclone; and determine corresponding signaling containing information about an operating state of the current operation of the hydrocyclone based upon a comparison of the learned signaling and the raw signaling.

31 Claims, 4 Drawing Sheets

The Particle Size Tracking (PST) System 30

(51) Int. Cl.
  *B04C 11/00*  (2006.01)
  *G06N 3/02*  (2006.01)

(56) References Cited

U.S. PATENT DOCUMENTS

| | | | |
|---|---|---|---|
| 5,333,240 A | 7/1994 | Matsumoto et al. | |
| 6,143,183 A | 11/2000 | Wardwell et al. | |
| 6,983,850 B2* | 1/2006 | Olson | B04C 11/00 |
| | | | 209/720 |
| 9,289,805 B2* | 3/2016 | Bagnoli | E21B 21/065 |
| 9,645,001 B2* | 5/2017 | Van Der Spek | G01N 15/10 |
| 9,770,723 B2* | 9/2017 | Castro | B01D 21/267 |
| 2008/0262810 A1 | 10/2008 | Moran et al. | |
| 2012/0209550 A1* | 8/2012 | Van Der Spek | G01N 15/10 |
| | | | 702/63 |
| 2013/0153694 A1* | 6/2013 | Held | B02C 25/00 |
| | | | 241/15 |
| 2016/0034809 A1 | 2/2016 | Trenholm et al. | |
| 2021/0023570 A1* | 1/2021 | Maron | B04C 11/00 |

* cited by examiner

A system 10

> A learning network 11 having a signal processor 12 configured at least to:
>
> receive learned signaling containing information about representative samples of conditions related to operating states of a hydrocyclone and characterized as learned samples of each condition when the learning network is trained, and raw signaling containing information about raw samples containing information about the current operation of the hydrocyclone;
>
> determine corresponding signaling containing information about an operating state of the current operation of the hydrocyclone based upon a comparison of the learned signaling and the raw signaling; and/or
>
> provide the corresponding signaling as a control signal either to change the operating state of the hydrocyclone system, including turning the hydroclone OFF, or to provide an audio or visual warning containing information about the operating state of the current operation of the hydrocyclone.

Other signal processor circuits or components 14 that do not form part of the underlying invention, e.g., including input/output modules, one or more memory modules, data, address and control busing architecture, etc.

Figure 2: The System 10

20

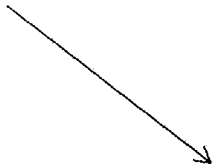

20a: Receiving, with a learning network having a signal processor 12, learned signaling containing information about representative samples of conditions related to operating states of a hydrocyclone and characterized as learned samples of each condition when a learning network is trained, and raw signaling containing information about raw samples containing information about the current operation of the hydrocyclone 20b: Determining, with the learning network having the signal processor 12, corresponding signaling containing information about an operating state of the current operation of the hydrocyclone based upon a comparison of the learned signaling and the raw signaling; and/or 20c: Providing, with learning network having the signal processor 12, the corresponding signaling as a control signal either to change the operating state of the hydrocyclone system, including turning the hydroclone OFF, or to provide an audio or visual warning containing information about the operating state of the current operation of the hydrocyclone Figure 3: The Basic Method Having a Flowchart 20

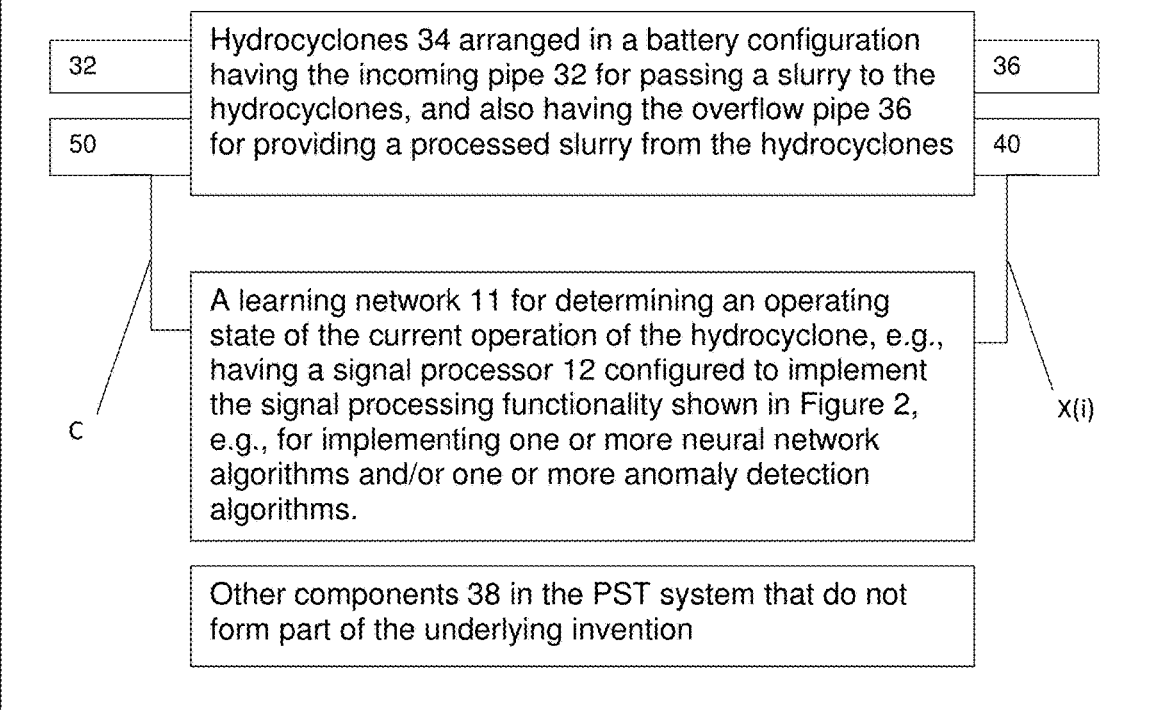
Figure 4: The Particle Size Tracking (PST) System 30

ANOMALY DETECTION AND NEURAL NETWORK ALGORITHMS FOR PST HYDROCYCLONE CONDITION MONITORING

CROSS-REFERENCE TO RELATED APPLICATIONS

This application claims benefit to provisional patent application Ser. No. 62/397,565, filed 21 Sep. 2016; which is incorporated by reference in its entirety.

OTHER RELATED APPLICATIONS

This application is related to PCT patent application serial no. PCT/US2016/0167721, filed 5 Feb. 2016, which claims benefit to provisional patent application Ser. No. 62/112,433, filed 5 Feb. 2015, which are both incorporated by reference in their entirety.

This application is related to PCT patent application serial no. PCT/US2016/015334, filed 28 Jan. 2016, which claims benefit to provisional patent application Ser. No. 62/108,689, filed 25 Jan. 2015, and which corresponds to U.S. patent application Ser. No. 15/084,420, filed 28 Feb. 2013, which are all incorporated by reference in their entirety.

This application is related to PCT patent application serial no. PCT/US2014/52628, filed 26 Aug. 2014, which claims benefit to provisional patent application Ser. No. 61/869,901, filed 26 Aug. 2013, and which corresponds to U.S. patent application Ser. No. 14/914,048, filed 24 Feb. 2016, which are all incorporated by reference in their entirety.

This application is related to PCT patent application serial no. PCT/US2014/012510, filed 22 Jan. 2014, which claims benefit to provisional patent application Ser. No. 61/755,305, filed 22 Jan. 2013, and which corresponds to U.S. patent application Ser. No. 14/762,223, filed 21 Jul. 2015, which are all incorporated by reference in their entirety.

This application is related to PCT patent application serial no. PCT/US2011/050500, filed 6 Sep. 2011, which claims benefit to provisional patent application Ser. No. 61/379,899, filed 3 Sep. 2010, and which corresponds to U.S. patent application Ser. No. 13/820,033, filed 28 Feb. 2013, which are all incorporated by reference in their entirety.

This application is related to PCT/US2010/45178, filed 11 Aug. 2010, which claims benefit to provisional patent application Ser. No. 61/232,875, filed 11 Aug. 2009; Ser. No. 61/400,819, filed 2 Aug. 2010; and Ser. No. 61/370,154, filed 3 Aug. 2010, and which corresponds to patent application Ser. No. 13/389,546, filed 24 Apr. 2012, which are all incorporated by reference in their entirety.

This application is related to PCT/US10/38281, filed 11 Jun. 2010, which claims benefit to provisional patent application Ser. No. 61/186,502, 12 Jun. 2009, and which corresponds to U.S. patent application Ser. No. 13/377,083, filed 21 Feb. 2012, which are all incorporated by reference in their entirety.

This application is also related to PCT/US2009/043438, filed 11 May 2009, which claims benefit to provisional patent application Ser. No. 61/051,775, 61/051,791, and 61/051,803, all filed 9 May 2008, and which corresponds to patent application Ser. No. 12/991,636, filed 1 Feb. 2011, which are all incorporated by reference in their entirety.

The aforementioned applications were all assigned to the assignee of the present application, which builds on this family of technology.

BACKGROUND OF THE INVENTION

1. Field of Invention

This invention relates to a technique for hydrocyclone condition monitoring; and more particularly, to a technique for hydrocyclone condition monitoring using particle size detection.

2. Description of Related Art

In the prior art, a Particle Size Tracking (PST) probe may be used to detect acoustic vibrations created by impacts of material inside a pipe. When placed in the overflow of a hydrocyclone the acoustic vibrations contain an abundance of information of the characteristics of the material which can be used to detect the operating conditions of the hydrocyclone. Various operating conditions that can be detected include a plugged cyclone, a roping cyclone or the on/off conditions. However, this PST information can be difficult to interpret and usually requires a reasonably complex analysis to be able to reliably determine the correct state.

In view of this, there is a need for a better way to determine the operating state and/or condition of one or more hydrocyclones in a battery configuration.

SUMMARY OF THE INVENTION

According to some embodiments of the present invention, the technique may include, or take the form of, a system featuring a learning network having a signal processor configured to:

receive learned signaling containing information about representative samples of conditions related to operating states of a hydrocyclone and characterized as learned samples of each condition when the learning network is trained, and raw signaling containing information about raw samples containing information about the current operation of the hydrocyclone; and determine corresponding signaling containing information about an operating state of the current operation of the hydrocyclone based upon a comparison of the learned signaling and the raw signaling.

The present invention may also include one or more of the following features:

The signal processor may be configured to provide the corresponding signaling as a control signal either to change the operating state of the hydrocyclone system, including turning the hydroclone OFF, or to provide an audio or visual warning containing information about the operating state of the current operation of the hydrocyclone.

The learning network may include a neural network having the signal processor configured to implement one or more neural network algorithms, e.g., including where the signal processor may be configured to implement a neural network algorithm based upon a measurement of particle sizes of material in a process flow inside the hydrocyclone and detected by a particle size tracking (PST) probe arranged in relation to the hydrocyclone.

The system may include, or take the form of, a particle size tracking system, e.g., having a PST probe arranged in relation to the hydrocyclone.

The learned signaling and the raw signaling may contain information about acoustic vibrations created by impacts of material in a process flow inside the hydrocyclone and detected by the PST probe arranged in relation to the hydrocyclone.

The PST probe may be arranged in an overflow of the hydrocyclone.

The learned signaling may be stored in, and/or received from, a memory as the learned samples of each condition when the learning network is trained.

The signal processor may be configured to determine changes in complex waveforms and characterize differences between the operating states.

The operating states of the hydrocyclone may include a normal operating state and a roping operating state; and the signal processor may be configured to determine the operating state as either the normal operating state or the roping operating state based upon the comparison of the learned signaling and the raw signaling.

The neural network may be programmed to give a high value when the roping operating state is detected and a low value when the normal operating state occurs.

The learning network may include the signal processor implementing a series of anomaly detection algorithms; including where the signal processor may be configured to implement an anomaly detection algorithm in order to reduce risks associated with a slurry in a pipe changing acoustic characteristics over time.

The operating states of the hydrocyclone may include a normal state, a roping state, a plugged state and ON/OFF states.

The neural network may include a cyclone raw state based upon a P150 measurement from a particle size tracking (PST) probe that is used to indicate different operating states, including where the P150 measurement may be based upon a particle size measurement of about 150 microns.

The learning network may also include one or more neural networks in combination with one or more anomaly detection algorithm, including where the signal processor is configured to implement the one or more neural networks in combination with the one or more anomaly detection algorithm.

According to some embodiments, the present invention may take the form of a PST system, e.g., featuring a learning network having a signal processor configured to implement the signal processing functionality set forth above. The PST system may also include one or more other features, e.g., consistent with that set forth above.

According to some other embodiments, the present invention may take the form of a method featuring steps for
   receiving, with a learning network having a signal processor, learned signaling containing information about representative samples of conditions related to operating states of a hydrocyclone and characterized as learned samples of each condition when the learning network is trained, and raw signaling containing information about raw samples containing information about the current operation of the hydrocyclone; and
   determining, with the learning network having the signal processor, corresponding signaling containing information about an operating state of the current operation of the hydrocyclone based upon a comparison of the learned signaling and the raw signaling.

The method may include one or more of the features set forth above.

The signal processor or signal processor module may include, or take the form of, a signal processor and at least one memory including a computer program code, where the signal processor and at least one memory are configured to cause the learning network to implement the signal processing functionality of the present invention, e.g., to respond to the learned signaling and the raw signaling; and determine the corresponding signaling containing information about an operating state of the current operation of the hydrocyclone based upon a comparison of the learned signaling and the raw signaling.

According to some embodiment, the present invention may take the form of apparatus comprising means for receiving learned signaling containing information about representative samples of conditions related to operating states of a hydrocyclone and characterized as learned samples of each condition when the learning network is trained, and raw signaling containing information about raw samples containing information about the current operation of the hydrocyclone; and determining corresponding signaling containing information about an operating state of the current operation of the hydrocyclone based upon a comparison of the learned signaling and the raw signaling. By way of example, the means for receiving, determining and/or providing may comprise a neural network having a signal processor configured to implement signal processing functionality based upon one or more neural network algorithms associated with receiving the signaling, determining the corresponding signaling and providing the corresponding signaling. Alternatively, and by way of further example, the means for receiving, determining and/or providing may comprise a signal processor configured to implement signal processing functionality based upon one or more anomaly detection algorithms associated with receiving the signaling, determining the corresponding signaling and providing the corresponding signaling.

According to some embodiments, the present invention may also take the form of a computer-readable storage medium having computer-executable components for performing the steps of the aforementioned method. The computer-readable storage medium may also include one or more of the features set forth above.

One advantage of the present invention is that it provides a better way to determine the operating state and/or condition of one or more hydrocyclones in a battery configuration.

BRIEF DESCRIPTION OF THE DRAWING

The drawing includes FIGS. 1-4, which are not necessarily drawn to scale, as follows:

FIG. 2 is a block diagram of a system having a learning network with a signal processor for implementing signal processing functionality, according to some embodiments of the present invention.

FIG. 3 is a flowchart of a method or algorithm having steps for implementing signal processing functionality with a signal processor, according to some embodiments of the present invention.

FIG. 4 is a block diagram of a particle size tracking system having hydrocyclones and a learning network having a signal processor for implementing signal processing functionality, e.g., either a neural network algorithm or an anomaly detection algorithm, to determine the states of the hydrocyclone, according to some embodiments of the present invention.

DETAILED DESCRIPTION OF BEST MODE OF THE INVENTION

Summary of Basic Invention

Figure 1:
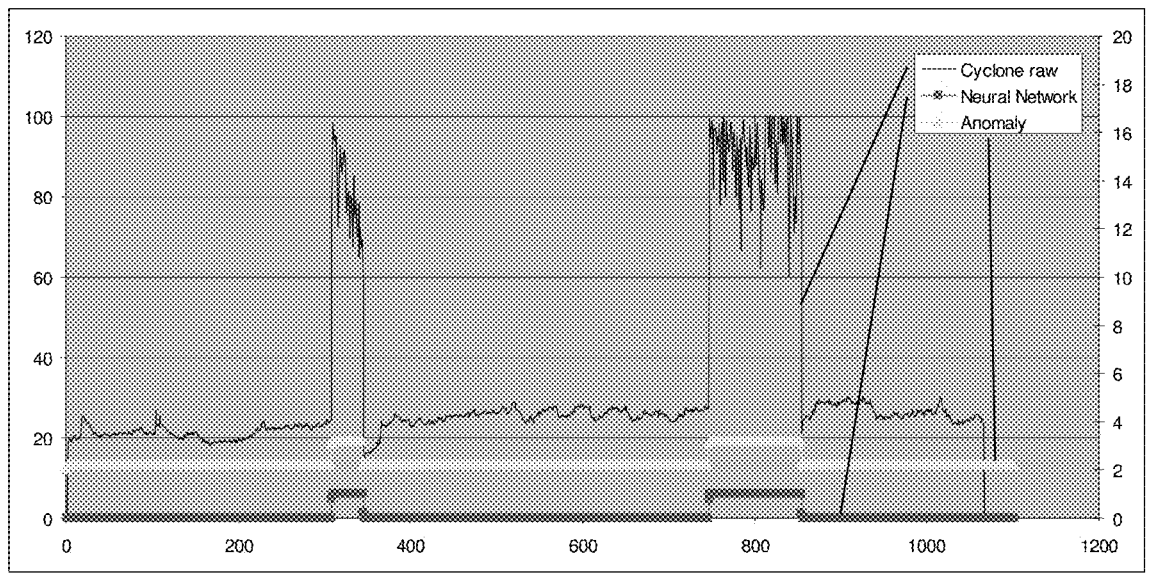
FIG. 1 is a graph showing plots of an example of a hydrocyclone that operates in at least two different states: a normal operation and then an anomaly state such as a roping state.

In summary, the present invention provides two new techniques for hydrocyclone condition monitoring that can be used to determine cyclone operating states.

By way of example, the first technique includes using neural networks that are ideally suited for determining subtle changes in complex waveforms and then being able to characterize the differences between various operating states. If a neural network is trained on various conditions of ON/OFF and roping versus normal operation, it will be able to accurately determine the operating states. FIG. 1 shows plots of an example of a hydrocyclone that operates in two different states: a normal operation and then a roping state. The cyclone raw state is the P150 measurement from the PST probe and is just used to indicate the different states. The darker function in FIG. 1 is the results from the neural network evaluation of the raw signal. It is programmed to give a high value when a roping condition is detected, and a low value when a normal operation is occurring. As seen, it performs well when properly trained with a representative sample of each condition.

One limitation of the uses of neural network algorithms is that they require training on each specific type of condition under which detection is required. It can be difficult to obtain sufficient data to do this for each condition, and in addition it is also possible that as the slurry in the PST pipe changes the acoustic characteristics change enough that the neural network encounters a signature it has not seen before and cannot categorize it, even though it may be in a known condition. An alternative approach to help reduce this risk is to use a series of algorithms known as anomaly detection algorithms (By way of example, see Chandola, Banerjee and Kumar, "Anomaly Detection: A Study", ACM Computing Surveys, September 2009.). Anomaly detection typically starts with building profiles of normal behaviors and then detecting any deviation of a new behavior from the learned normal profiles. This fits well with the PST system, which may not always be able to detect the nuances between a roping hydrocyclone versus a blocked hydrocyclone but can tell that it is not operating correctly. In FIG. 1, the light colored plot represents the output of a typical anomaly detection algorithm that assumed a parabolic distribution of the normal condition. It is set up to indicate high in an abnormal condition and low when the cyclone data is running in the normal condition. As seen it also detects easily the two out-of-class conditions for the cyclone.

The following is a discussion of specific examples or implementations, according to some embodiments of the present invention.

FIG. 2

By way of example, FIG. 2 shows a system generally indicated as 10 having a learning network generally indicated as 11, e.g. with at least one signal processor 12 for implementing the signal processing functionality according to some embodiments of the present invention. In operation, the at least one signal processor 12 may be configured to:
receive learned signaling containing information about representative samples of conditions related to operating states of a hydrocyclone and characterized as learned samples of each condition when the learning network is trained, and raw signaling containing information about raw samples containing information about the current operation of the hydrocyclone; and
determine corresponding signaling containing information about an operating state of the current operation of the hydrocyclone based upon a comparison of the learned signaling and the raw signaling.

By way of further example, the signal processor 12 may be configured to provide the corresponding signaling as a control signal either to change the operating state of the hydrocyclone system, including turning the hydroclone OFF, or to provide an audio or visual warning containing information about the operating state of the current operation of the hydrocyclone, e.g., consistent with that described in relation to FIG. 4.

By way of further example, and according to some embodiments, the learning network 11 may include, or take the form of, a neural network, and the signal processor 12 may be configured to implement one or more neural network algorithms, e.g., including where the signal processor 12 is based upon a measurement of particle sizes of material in a process flow inside the hydrocyclone and detected by a particle size tracking (PST) probe arranged in relation to the hydrocyclone.

By way of still further example, and according to some embodiments, the learning network 11 may include, or take the form of, an anomaly detection algorithm, and the signal processor 12 may be configured to implement a series of anomaly detection algorithms, e.g., including where the signal processor 12 is configured to implement an anomaly detection algorithm in order to reduce risks associated with a slurry in a pipe changing acoustic characteristics over time.

It is important to note that neural network algorithms and anomaly detection algorithms may be understood to be types of "supervised learning" algorithms, e.g., that can used independently of each other. There are also other similar types or kinds of algorithms that may include decision trees and regression analysis, which may be used herein as other types of alternative methods or algorithms. Moreover, the scope of the invention is intended to include, and embodiments are envisioned, e.g., implementing one or more neural network algorithms in combination with one or more anomaly detection algorithms.

The functionality of the signal processor or processor module 12 may be implemented using hardware, software, firmware, or a combination thereof. In a typical software implementation, the processor module 12 may include one or more microprocessor-based architectures having a microprocessor, a random access memory (RAM), a read only memory (ROM), input/output devices and control, data and address buses connecting the same, e.g., consistent with that shown in FIG. 2, e.g., see the other signal processor circuits or components 14. One person skilled in the art would be able to program such a microprocessor-based architecture(s) to perform and implement such signal processing functionality described herein without undue experimentation. The scope of the invention is not intended to be limited to any particular implementation using any such microprocessor-based architecture or technology either now known or later developed in the future.

By way of example, the learning network 11 having the signal processor module 12 may also include, e.g., other signal processor circuits or components 14 that do not form part of the underlying invention, e.g., including input/output modules, one or more memory modules, data, address and control busing architecture, etc. In operation, the at least one signal processor 12 may cooperation and exchange suitable data, address and control signaling with the other signal processor circuits or components 14 in order to implement the signal processing functionality according to the present invention. By way of example, the signaling may be received by such an input module, provided along such a data bus and stored in such a memory module for later processing, e.g., by the at least one signal processor 12. After such later processing, processed signaling resulting from any such determination may be stored in such a memory module, provided from such a memory module along such a data bus to such an output module, then provided from such an output module as the corresponding signaling C, e.g., by the at least one signal processor 12, as the control signaling.

FIG. 3

FIG. 3 shows a method generally indicated as 20 having steps 20a, 20b and 20c for implementing the signal processing functionality or algorithm, e.g., with at least one signal processor like element 12 in FIG. 2, according to some embodiments of the present invention.

The method 20 may include a step 20a for receiving, with a learning network 11 having a signal processor like element 12, learned signaling containing information about representative samples of conditions related to operating states of a hydrocyclone and characterized as learned samples of each condition when the learning network 11 is trained, and raw signaling containing information about raw samples containing information about the current operation of the hydrocyclone, e.g., consistent with that set forth herein.

The method 20 may include a step 20b for determining, with the learning network 11 having the signal processor 12, corresponding signaling containing information about an operating state of the current operation of the hydrocyclone based upon a comparison of the learned signaling and the raw signaling.

The method 20 may also include a step 20c for providing, with the learning 11 network having the signal processor 12, the corresponding signaling as a control signal either to change the operating state of the hydrocyclone system, including turning the hydroclone OFF, or to provide an audio or visual warning containing information about the operating state of the current operation of the hydrocyclone.

The method may also include one or more steps for implementing other features of the present invention set forth herein, including steps for making the various determinations associated with one or more anomaly detection algorithms or techniques, e.g., consistent with that set forth herein.

FIG. 4: The PST System 30

FIG. 4 shows a particle size tracking (PST) system generally indicated as 30 having a slurry flowing via the incoming piping 32 into one or more hydrocyclones 34 arranged in a battery configuration, and exiting the hydrocyclones 34 via one or more overflow pipes 36. The hydrocyclones 34 are arranged in the battery configuration having the one or more incoming pipes 32 for passing the slurry to the hydrocyclones 34, and also having the one or more overflow pipes 36 for providing a processed slurry from the hydrocyclones 34. The PST system 30 may include one or more individual cyclone sensors 40 arranged on each of the one or more individual cyclones in the hydrocyclone 34 being evaluated and controlled. In operation, the respective individual cyclone control or sensor signaling x(i) may contain information about the particle size P(i) of particles passing through each of the individual cyclones being evaluated and controlled; and the respective individual cyclone control or sensor signaling x(i) may be generated by the individual cyclone sensors 40 arranged on each of the individual cyclones being evaluated and controlled. The PST system 30 may also include at least one flow rate and pressure regulator 50 that responds to the control signaling C provided by the learning network 11 having the signal processor 12, and controls the operating state of the one or more hydrocyclones 34, including turning one or more of the hydrocyclones OFF, e.g., by regulating (e.g., stopping) the flow rate and pressure the slurry flowing from the incoming piping 32.

In FIG. 4, the PST system 30 includes the learning network 11 (see also FIG. 2) having the signal processor 12 for implementing signal processing control functionality to determine the operating states of the hydrocyclones, according to some embodiments of the present invention. In operation, the learning network 11 may also be configured for controlling the slurry flowing from the incoming piping 32 and entering the hydrocyclones 34 arranged in the battery configuration, e.g., having the signal processor 12 configured to implement the signal processing functionality shown in FIG. 2. Consistent with that set forth above, the learning network 11 may include the signal processor 12 being configured to implement one or more neural network algorithms, anomaly detection algorithms, as well as other similar types of algorithms that may include decision trees and regression analysis, etc.

The PST system 30 also includes other components 38 in the PST system that do not form part of the underlying invention, e.g., which would be understood and appreciate by a person skilled in the art.

Hydrocyclones like element 34, cyclone sensors like element 40 and flow rate and pressure regulators like element 50 are known in the art, and the scope of the invention is not intended to be limited to any particular type or kind thereof, e.g., either now known or later developed in the future. By way of example, see the assignee's family of related hydrocyclone-related patent applications set forth above, as well as assignee's hydrocyclone products and patents set forth below.

The Assignee's Hydrocyclone Products and Patents

By way of example, the assignee of the instant patent application has developed hydrocyclone products, which are disclosed in one or more of the following granted U.S. Pat. Nos. 6,354,147; 6,435,030; 6,587,798; 6,601,458; 6,609,069; 6,691,584; 6,732,575; 6,813,962; 6,862,920; 6,889,562; 6,988,411; 7,032,432; 7,058,549; 7,062,976; 7,086,278; 7,110,893; 7,121,152; 7,127,360; 7,134,320; 7,139,667; 7,146,864; 7,150,202; 7,152,003; 7,152,460; 7,165,464; 7,275,421; 7,359,803; 7,363,800; 7,367,240; 7,343,820; 7,437,946; 7,529,966; and 7,657,392, which are all incorporated by reference in their entirety. The disclosure herein related to the present invention is intended to be interpreted consistent with the family of technologies disclosed in all the issued patents incorporated by reference herein.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A system comprising:
a learning network having a signal processor configured to:
receive learned signaling containing information about representative samples of conditions related to operating states of a hydrocyclone and characterized as learned samples of each condition when the learning network is trained, and raw signaling containing information about raw samples related to the current operation of the hydrocyclone; and
determine corresponding signaling containing information about an operating state of the current operation of the hydrocyclone based upon a comparison of the learned signaling and the raw signaling;
wherein the learned signaling and the raw signaling contain information about acoustic vibrations created by impacts of material in a process flow inside the hydrocyclone and detected by a Particle Size Tracking (PST) probe arranged in the hydrocyclone.

2. A system according to claim 1, wherein the signal processor configured to provide the corresponding signaling as a control signal either to change the operating state of the hydrocyclone system, including turning the hydrocyclone OFF, or to provide an audio or visual warning containing information about the operating state of the current operation of the hydrocyclone.

3. A system according to claim 1, wherein the learning network comprises a neural network having the signal processor configured to implement one or more neural network algorithms, including where the signal processor is configured to implement a neural network algorithm based upon a measurement of particle sizes of material in a process flow inside the hydrocyclone and detected by a particle size tracking (PST) probe arranged in relation to the hydrocyclone.

4. A system according to claim 1, wherein the PST probe is arranged in an overflow of the hydrocyclone.

5. A system according to claim 1, wherein the learned signaling is stored in, and received from, a memory as the learned samples of each condition when the learning network is trained.

6. A system according to claim 1, wherein the signal processor is configured to determine changes in complex waveforms and characterize differences between the operating states.

7. A system according to claim 1, wherein
the operating states of the hydrocyclone include a normal operating state and a roping operating state; and
the signal processor is configured to determine the operating state as either the normal operating state or the roping operating state based upon the comparison of the learned signaling and the raw signaling.

8. A system according to claim 7, wherein the signal processor is programmed to give a high value when the roping operating state is detected and a low value when the normal operating state occurs.

9. A system according to claim 1, wherein the learning network comprises a series of anomaly detection algorithms, including where the signal processor is configured to implement an anomaly detection algorithm in order to reduce risks associated with a slurry in a pipe changing acoustic characteristics over time.

10. A system according to claim 1, wherein the system is a particle size tracking system.

11. A system according to claim 1, wherein the operating states of the hydrocyclone include a normal state, a roping state, a plugged state and ON/OFF states.

12. A system according to claim 3, wherein the neural network includes a cyclone raw state based upon a P150 measurement from the PST probe that is used to indicate different operating states.

13. A system according to claim 12, wherein the P150 measurement is based upon a particle size measurement of about 150 microns.

14. A method comprising:
receiving, with a learning network having a signal processor, learned signaling containing information about representative samples of conditions related to operating states of a hydrocyclone and characterized as learned samples of each condition when the learning network is trained, and raw signaling containing information about raw samples related to the current operation of the hydrocyclone; and
determining, with the learning network having the signal processor, corresponding signaling containing information about an operating state of the current operation of the hydrocyclone based upon a comparison of the learned signaling and the raw signaling;
wherein the learned signaling and the raw signaling contain information about acoustic vibrations created by impacts of material in a process flow inside the hydrocyclone and detected by a Particle Size Tracking (PST) probe arranged in the hydrocyclone.

15. A method according to claim 14, wherein the method comprises providing with the signal processor the corresponding signaling as a control signal either to change the operating state of the hydrocyclone system, including turning the hydrocyclone OFF, or to provide an audio or visual warning containing information about the operating state of the current operation of the hydrocyclone.

16. A method according to claim 14, wherein the method comprises configuring the learning network with a neural network having the signal processor for implementing one or more neural network algorithms.

17. A method according to claim 14, wherein the method comprises arranging the PST probe in an overflow of the hydrocyclone.

18. A method according to claim 14, wherein the method comprises storing the learned signaling in, and receiving the learned signaling from, a memory as the learned samples of each condition when the learning network is trained.

19. A method according to claim 14, wherein the method comprises determining with the signal processor changes in complex waveforms and characterize differences between the operating states.

20. A method according to claim 14, wherein
the operating states of the hydrocyclone include a normal operating state and a roping operating state; and
the method comprises determining with the signal processor the operating state as either the normal operating state or the roping operating state based upon the comparison of the learned signaling and the raw signaling.

21. A method according to claim 20, wherein the method comprises programming the signal processor to give a high value when the roping operating state is detected and a low value when the normal operating state occurs.

22. A method according to claim 14, wherein the method comprises implementing with the learning network with a series of anomaly detection algorithms, including implementing with the signal processor an anomaly detection algorithm in order to reduce risks associated with a slurry in a pipe changing acoustic characteristics over time.

23. A method according to claim 14, wherein the method comprises configuring the system as a PST system.

24. A method according to claim 14, wherein the operating states of the hydrocyclone include a normal state, a roping state, a plugged state and ON/OFF states.

25. A method according to claim 16, wherein the method comprises including in the neural network a cyclone raw state based upon a P150 measurement from the PST probe that is used to indicate different operating states.

26. A method according to claim 25, wherein the method comprises basing the P150 measurement upon a particle size measurement of about 150 microns.

27. An apparatus comprising:
  means for receiving learned signaling containing information about representative samples of conditions related to operating states of a hydrocyclone and characterized as learned samples of each condition when a learning network is trained, and raw signaling containing information about raw samples related to the current operation of the hydrocyclone; and
  means for determining corresponding signaling containing information about an operating state of the current operation of the hydrocyclone based upon a comparison of the learned signaling and the raw signaling;
  wherein the learned signaling and the raw signaling contain information about acoustic vibrations created by impacts of material in a process flow inside the hydrocyclone and detected by a Particle Size Tracking (PST) probe arranged in the hydrocyclone.

28. Apparatus according to claim 27, wherein the apparatus comprises means for providing the corresponding signaling as a control signal either to change the operating state of the hydrocyclone system, including turning the hydrocyclone OFF, or to provide an audio or visual warning containing information about the operating state of the current operation of the hydrocyclone.

29. Apparatus according to claim 27, wherein the means for receiving, determining and/or providing comprise the learning network having a signal processor configured to implement signal processing functionality based upon one or more neural network algorithms associated with receiving the signaling, determining the corresponding signaling and providing the corresponding signaling.

30. Apparatus according to claim 28, wherein the means for receiving, determining and/or providing comprise the learning network having a learning signal processor configured to implement signal processing functionality based upon one or more anomaly detection algorithms associated with receiving the signaling, determining the corresponding signaling and providing the corresponding signaling.

31. A system according to claim 1, wherein the learning network comprises one or more neural networks in combination with one or more anomaly detection algorithms.

* * * * *